United States Patent
Sadler et al.

(10) Patent No.: US 9,954,836 B2
(45) Date of Patent: Apr. 24, 2018

(54) WIRELESS NETWORK INFORMATION FLOW CONDITIONING

(71) Applicant: Bank of America Corporation, Charlotte, NC (US)

(72) Inventors: Brad Sadler, San Francisco, CA (US); Ramakrishna R. Yannam, Seattle, WA (US)

(73) Assignee: Bank of America Corporation, Charlotte, NC (US)

(*) Notice: Subject to any disclaimer, the term of this patent is extended or adjusted under 35 U.S.C. 154(b) by 83 days.

(21) Appl. No.: 14/934,278

(22) Filed: Nov. 6, 2015

(65) Prior Publication Data

US 2017/0134353 A1   May 11, 2017

(51) Int. Cl.
*H04L 29/06* (2006.01)
*G06F 21/62* (2013.01)
(Continued)

(52) U.S. Cl.
CPC ........ *H04L 63/062* (2013.01); *G06F 21/6245* (2013.01); *H04L 63/0414* (2013.01);
(Continued)

(58) Field of Classification Search
None
See application file for complete search history.

(56) References Cited

U.S. PATENT DOCUMENTS 6,029,141 A * 2/2000 Bezos ................ G06Q 20/0855
705/26.41

6,067,525 A * 5/2000 Johnson ................ G06Q 10/06
705/7.13
(Continued)

FOREIGN PATENT DOCUMENTS

WO   WO2014/032039   2/2014

OTHER PUBLICATIONS

Kwan, Michael; Why You Should turn Off WiFi Auto-Connect on Your Android Phone; 2011; Retrieved from the Internet <URL: http://www.mobilemag.com/2011/05/18/whyyoushouldturnoffwifiautoconnectonyourandroidphone/ 4/>; pp. 1-4 as printed.*

(Continued)

*Primary Examiner* — Saleh Najjar
*Assistant Examiner* — Michael W Chao
(74) *Attorney, Agent, or Firm* — Weiss & Arons LLP; Michael A. Springs, Esq.

(57) ABSTRACT

Apparatus and methods for conditioning wireless information flow in a wireless network. The system may include a processor that stores a digital key in a mobile device machine readable memory location designated for an optional WIFI frame field. The digital key may have a length (e.g., in bits) that is equal to a standard-specified length of the optional field. The digital key may have a length that is different from (e.g., longer or shorter than) the standard-specific length of the optional field. The optional field may include an IEEE 802.1Q virtual local area network ("VLAN") address, tag or field or any other suitable optional WIFI-related field. The key may correspond to a user flow conditioning database record that corresponds to an individual having access to the processor. The record may be used to provide service to the user.

8 Claims, 7 Drawing Sheets

(51) Int. Cl.

| | |
|---|---|
| *H04L 29/08* | (2006.01) |
| *G06Q 30/02* | (2012.01) |
| *H04W 48/10* | (2009.01) |
| *H04L 12/46* | (2006.01) |
| *H04W 84/14* | (2009.01) |

(52) U.S. Cl.
CPC .......... *H04L 63/0421* (2013.01); *H04L 67/22* (2013.01); *G06Q 30/02* (2013.01); *H04L 12/4633* (2013.01); *H04W 48/10* (2013.01); *H04W 84/14* (2013.01)

(56) References Cited

U.S. PATENT DOCUMENTS

| | | | | |
|---|---|---|---|---|
| 8,688,147 | B2* | 4/2014 | Nguyen | G06Q 30/0207 455/414.1 |
| 9,818,145 | B1* | 11/2017 | Finkelstein | G06Q 30/0631 |
| 2002/0091568 | A1* | 7/2002 | Kraft | G06Q 30/02 705/14.58 |
| 2007/0053353 | A1* | 3/2007 | Lee | H04L 12/4654 370/389 |
| 2007/0138268 | A1* | 6/2007 | Tuchman | G06Q 30/02 235/383 |
| 2010/0205062 | A1* | 8/2010 | Glatt | G06Q 20/102 705/17 |
| 2011/0251892 | A1* | 10/2011 | Laracey | G06Q 30/0253 705/14.51 |
| 2012/0036015 | A1 | 2/2012 | Sheikh | |
| 2012/0054493 | A1* | 3/2012 | Bradley | H04W 8/005 713/171 |
| 2012/0197724 | A1* | 8/2012 | Kendall | G06Q 30/0261 705/14.58 |
| 2012/0232994 | A1* | 9/2012 | Kim | G06Q 30/0261 705/14.58 |
| 2013/0091130 | A1 | 4/2013 | Barrow | |
| 2013/0103765 | A1* | 4/2013 | Papakipos | G06Q 50/01 709/206 |
| 2013/0282438 | A1* | 10/2013 | Hunter | G01S 1/02 705/7.32 |
| 2014/0164179 | A1* | 6/2014 | Geisinger | G06Q 30/02 705/26.41 |
| 2014/0164282 | A1* | 6/2014 | Asbury | G06Q 30/0201 705/345 |
| 2014/0201212 | A1* | 7/2014 | Qi | H04L 67/303 707/741 |
| 2014/0279197 | A1 | 9/2014 | Ainsworth, III et al. | |
| 2015/0006293 | A1* | 1/2015 | Zhao | G06Q 30/0251 705/14.64 |
| 2015/0161712 | A1* | 6/2015 | Ponzetta | G06Q 30/0601 705/7.29 |
| 2015/0350897 | A1* | 12/2015 | Du | H04W 12/04 455/411 |
| 2017/0053330 | A1* | 2/2017 | Smith | G06Q 30/0613 |
| 2017/0236131 | A1* | 8/2017 | Nathenson | G06Q 30/0201 705/26.7 |

OTHER PUBLICATIONS

No stated author; 802.11-2007 IEEE Standard for Information technology Telecommunications and information exchange between systems Local and metropolitan area networks Specific requirements; 2007; Retrieved from the Internet <URL: http://standards.ieee.org/getieee802/download/802.11-2007.pdf>; pp. 1-199 as printed.*
"A Survival Guide," O' Reily Media, Inc., Retrieved on Sep. 17, 2015.
"Association Mechanism," Retrieved on Sep. 16, 2015, usenix.org.
"802.11 Association Process Explained," Retrieved on Sep. 16, 2015, Cisco Systems, Inc.
"Capture WiFi/ WLAN/ 802.11 Probe Request with tcpdump." May 25, 2013, Urbanjack.wordpress.com.
"CWAP 802.11—Probe Request/Response," Oct. 27, 2014, mrncciew.com.
"Your Devices Broadcast Unique Numbers, and They're Being Used to Track You," Retrieved on Sep. 28, 2014, howtogeek.com.
"Ethernet Frame Explained." Retrieved on Oct. 25, 2015. http://everything.explained.today/Ethernet_frame/.
"Ethernet Frame," Sep. 29, 2015, Wikimedia Foundation, Inc.
"Haktip 23—WiFi 101: Probe Requests and Responses," Aug. 5, 2011, Hak5, LLC.
"How 802.11 Wireless Works," Mar. 28, 2003, Microsoft.
"IEEE 802.1Q," Aug. 29, 2015, Wikimedia Foundation, Inc.
"IEEE 802.11," Sep. 15, 2015, Wikimedia Foundation, Inc.
"Implementing 802.11 probe request scanner using WARP platform," Retrieved on Sep. 16, 2015, IEEE Xplore.
Lee Hutchinson, "iOS 8 to stymie trackers and marketers with MAC address randomization," Jun. 9, 2014, Conde Nast.
"Is looking for WiFi access points purely passive'?" Apr. 6, 2010, superuser.com.
"When a MAC address itself is unique, why do we still need an IP address to uniquely identify a system on a network?" Jan. 3, 2015, Quora.com.
"MAC address," Sep. 10, 2015, Wikimedia Foundation, Inc.
Jack L. Burbank, Julia Andrusenko, Jared S. Everett, William T.M. Kasch, Wireless Networking: Understanding Interworking Challenges, Book, Jun. 2013, 4.6.6.7 MAC Frame Format, Wiley-IEEE Press.
"Media access control," Jun. 11, 2015, Wikimedia Foundation, Inc.
Charlie Schluting, "The OSI Reference Model—Understanding Layers," Jan. 13, 2005, www.webopedia.com.
"Promiscuous mode," Sep. 3, 2015, Wikimedia Foundation, Inc.
"iOS 8 is Randomizing MAC Addresses," Jun. 10, 2014, Scheiner.com.
"Show me your SSID's, I'll Tell You Who You Are"! Jan. 12, 2012, blog.rootshell.be.
Marco V. Barbera et al., "Signals from the Crowd: Uncovering Social Relationships through Smartphone Probes," Oct. 23-25, 2013, ACM, Inc.
Dr. Rajugopal Gubbi, "TG3 Proposed Changes to Frame Formats," Jul. 1, 2001, Broadcom, corp.
Nick Arnott, "What's really Happening with iOS 8 MAC Address Randomization?" Sep. 29, 2014, Mobile Nations.
J. F. F Kurose and K.W. Ross, "Wireshark Lab: 802.11 Solution," 2013 Pearson Education, Inc.
"802.11 WLAN Packet Types," Retrieved on Sep. 16, 2015, Savvius, Inc.
Bhupinder Misra, "Ios8 Randomization-Analyzed!" Air Tight Networks, Inc., Sep. 23, 2014.

\* cited by examiner

WIRELESS NETWORK INFORMATION FLOW CONDITIONING

FIELD OF TECHNOLOGY

Aspects of the invention relate to throttling of the flow of person-specific information.

BACKGROUND

Populations formerly were distributed in rural areas. Retail business was conducted at small stores where sales personnel knew customers personally and helped them accordingly. Many people migrated to urban areas where retail business has become large and centralized. Customers and sales personnel interact more anonymously, even in a face-to-face setting, proceeding from initial contact through final sale.

Online Internet business, which also has an anonymous character, has become a popular sales channel.

Large retail business use a combination of the channels, e.g., in-person and online, to service customers.

Customers that are accustomed to online shopping may have less inclination, when placed in a face-to-face setting, to interact with sales personnel. This may be especially true where online technology has been made available on portable communication devices so that a customer can examine merchandise in a vendor's brick-and-mortar establishment and simultaneously conduct an online comparison of prices of similar merchandise offered by a different vendor.

Merchant's offer WIFI connection to customers in brick-and-mortar facilities. The customers often use the WIFI for the comparative shopping. The merchants often use the WIFI to garner information about the customers or about the customers' portable communication devices. Using the information, the merchant may track the location of a customer within the merchant's facility. The customers may view the garnering as an invasion of privacy, but may be unable or unwilling to forego access to WIFI to prevent the invasion of privacy.

Customers have personal goals and needs and typically have accumulated vast numbers of personal. Businesses have used the data to market digitally, but strategies for using the data as a means to better meet those goals and needs during an on-site visit to the merchant's facility have not developed. Furthermore, the data may not be placed in a context that puts sales personnel in a position to address the goals and needs.

It would therefore be desirable to provide apparatus and methods for limiting or reducing privacy invasion while shopping by personalizing customer-sales personnel interactions.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
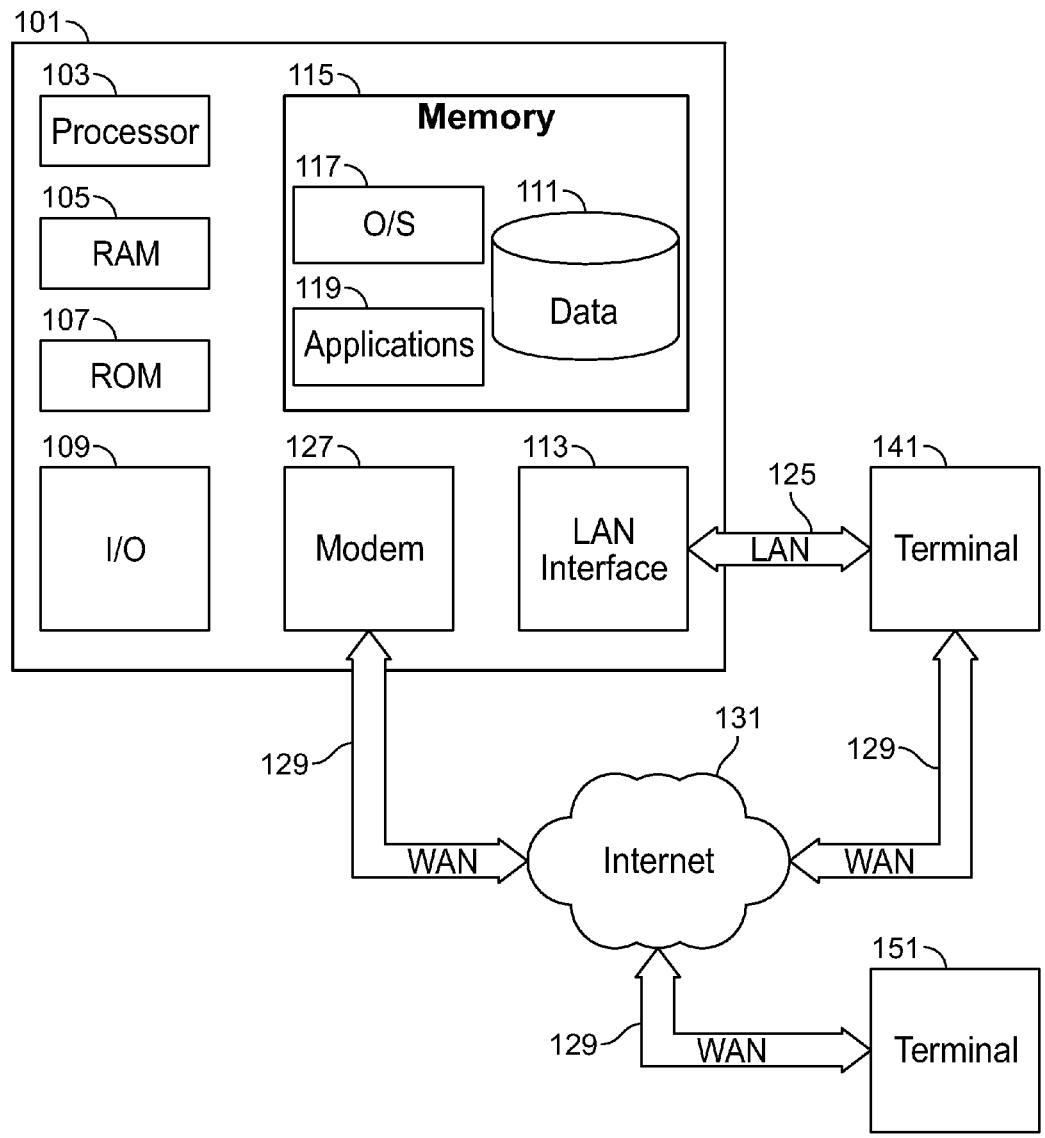
FIG. 1 shows illustrative apparatus in accordance with principles of the invention.

Apparatus and methods for conditioning wireless information flow in a wireless network are provided. The wireless network may include wirelessly and wiredly connected processors, transmitters and access points that support communications that comply with any suitable wireless communication standard, such as any standard conforming to IEEE standard 802.11, derivatives thereof and related standards.

The apparatus may include, and the methods may involve, a system. The system may operate in whole or in part on a computing device. The system may operate in whole or in part distributed over multiple computing devices. The computing device or devices may include a portable electronic wireless communication device.

The system may include a processor. The processor may be configured to store a digital key in a mobile device machine readable memory location designated for an optional WIFI frame field. The digital key may have a length (e.g., in bits) that is equal to a standard-specified length of the optional field. The digital key may have a length that is different from (e.g., longer or shorter than) the standard-specific length of the optional field. The optional field may include an IEEE 802.1Q virtual local area network ("VLAN") address, tag or field or any other suitable optional WIFI-related field.

The system may be configured to queue, for wireless transmission, a probe request. The probe request may be compliant with a probe request defined under IEEE 802.1Q or any other suitable WIFI-related probe request. The probe request may include a medium access control ("MAC") address corresponding uniquely to the processor. The system may include an interface for a user. The interface may be a user interface. The user interface may be configured to communicate to the processer an instruction to transmit the digital key to an access point. The user may be a customer. The customer may interact with a merchant.

The key may correspond to a user flow conditioning database record that corresponds to an individual having access to the processor. The key may include a first series of bits that correspond to a server address. The server address may be an address of a flow control server address as described herein or any other suitable server. The server address may be an IP address. The key may include a second series of bits that correspond to a user that has created or stored a digital customer calling card on the server.

The first series of bits may include the address. The address may be encoded by any suitable scheme. The first series of bits may be mapped to the address via a look-up table. The look-up table may be made publicly available. If the address is encoded, the merchant may thus obtain the look-up table to decipher the address and obtain the digital customer calling card from the server. Instructions for responding to probe request that includes the address may be made publicly available. The merchant may thus obtain the instructions and obtain the digital customer calling card from the server.

The second series of bits may correspond to the user. The second series of bits may be encoded by any suitable scheme. The code for decoding the second series of bits may be unavailable to the merchant.

The database record may include data that may be used to populate a digital customer calling card ("DCCC"). The digital customer calling card may support two-way communication between a customer and a merchant or merchant's representative (collectively and individually, "the merchant"). The digital customer calling card may allow the customer's needs and goals to define the relationship between the customer and the merchant across the retail landscape. The digital calling card may allow for hyper-targeted offers and specialized service that addresses stated needs. The digital calling card may be based on information that is non-predictive and is not based on analytics that purport to predict customer needs or behavior.

The apparatus may include a user interface that a user may use to create the digital calling card. The user interface may request a photo, select a merchant facility, receive from the customer long term goals, receive from the customer short term goals, receive from the customer goals for the merchant-customer relationship.

The merchant may be a provider of goods, services or both. The services may include financial services.

The user interface may be used to schedule an appointment with the merchant and to transmit an electronic calendar item to the merchant for the appointment. The user interface may attach a copy of the digital calling card to the electronic calendar item.

The digital calling card may facilitate face-to-face conversations, so the likelihood of a sale may be increased. The customer may be drawn toward a product that is consistent with the customer's goals.

The digital calling card may be stored on a transaction instrument. The digital key may be stored on a transaction instrument.

The transaction instrument may include any suitable transaction instrument, such as a smartphone, credit card, debit card, an instrument or device that includes a contactless chip, such as an ISO14443-compliant contactless chip, or any other electronic purchasing device or virtual purchasing instrument. The transaction instrument may be a virtual credit card, a virtual debit card or a virtual version of any other suitable card for transactions, whether cashless or cash-based. The virtual transaction instrument may be an electronic file that is stored on, or remotely accessible from, a customer access device such as customer access device 114 (shown in FIG. 1).

When the calling card or key is stored on a device that does not have an active radio frequency transmitter, the calling card information or the key may be transmitted to the merchant at a point-of-sale device or a card-swiping device, for example at a kiosk or at an ATM.

The digital customer calling card may include metadata. The metadata may be created by the customer. The metadata may summarize the customer's goals, needs or preferences. The preferences may be used like metadata in the sense that they may be combined with merchant data.

The apparatus and methods may apply analytics to the metadata to transform one or both of the metadata and merchant data into an offer of goods, personally-tailored customer service or both.

The customer may opt-in to a program that provides the digital customer calling card. The customer may opt-out of an offers program that does not use the digital customer calling card.

The apparatus and methods may provide some or all of the metadata to the merchant.

Use of the digital customer calling card may allay customer fears about improper use of big data, by allowing the customer to define his own data profile.

The user may select some or all of the metadata for inclusion in the digital customer calling card. The user may "dynamically filter" the calling card in that the user can select which data to include based on date, time, merchant identity, product pricing, product discounts, offers from affinity benefits providers and the like. The selection may be modified by the user at any suitable time.

The apparatus may include an online banking user interface. The user interface may include a Card Details page. The page may include controls and fields for entering preferences for general retail use. The page may include controls and fields for entering different preferences for different retail categories. The categories may be based on different merchant category codes ("MCC").

The page may include controls and fields for entering different preferences for different SKUs.

The customer use the controls and fields to indicate his or her clothes sizes and color preferences, for example. This information can be included in the card. Selected preferences can be shared in a retail environment with the merchant. The merchant may reciprocate by providing to the customer an offer. The offer may be an offer for immediate use.

The digital calling card may thus provide increased opportunities for a merchant to personally connect with a customer. Also, because the digital customer calling card may use the very same data communication structures as does a merchant's customer-tracking program, the digital customer calling card may force the merchant to provide improved and more personalized service to the customer.

The system may include a receiver. The system may include a transmitter. The receiver may be configured to receive a WIFI access point beacon. The processor may be configured to cause the transmitter to transmit the key over a WIFI channel only after the receiver receives the beacon.

The system may include a user interface. The processor may be configured to cause the transmitter to transmit the key only in response to a user-interface instruction to transmit the key. In this manner, the system may transmit the key to the access point as an initial communication in a wireless device association exchange. A valid VLAN tag, for example, may originate at the access point. A valid VLAN tag, for example, may be a VLAN tag that does not originate at the user's device, because the user's device may not have a priori—viz., before associating with the VLAN—knowledge of the VLAN tag or the VLAN tag's value. The system may have already receive the VLAN tag from the access point, perhaps in a beacon packet. The system may not be in possession of a VLAN tag. The unsolicited probe request therefore may be sent "agnostic" of the beacon packet. An access point that is configured to receive such an unsolicited probe request therefore may identify the very presence of bits in the VLAN tag field as an exceptional event that can later be used to trigger subsequent communication, as discussed herein.

The processor may receive from the user interface a user-input instruction to not automatically respond to a WIFI access point beacon. The processor may receive from the user interface a user-input instruction to broadcast the key.

The receiver may be configured to receive from the access point information corresponding to the optional field. The information may be a WIFI exception message corresponding to a non-compliant probe request.

The processor may be configured to obtain from an on-board geographic positioning system application map coordinates corresponding to a location of the processor at a time the probe request was transmitted. The processor may be configured to cause the transmitter to transmit to a customer database the digital key. The processor may be configured to cause the transmitter to transmit to a customer database a transmission log entry. The transmission log entry may correspond to transmission of the probe request. The transmission log entry may correspond to the map coordinates.

The processor may be configured to determine a merchant identity that corresponds to a merchant. The merchant may be located at the map coordinates. The processor may be configured to cause a display to display the merchant identity to a user. The processor may be configured to receive from the user a confirmation that the user is present in a location corresponding to the merchant identity.

The exception message may be an IEEE 802.1Q VLAN tag exception message. The information may be a digital merchant welcome card. The card may include one of or both a merchant information from a merchant database and user information.

Table 1 shows illustrative merchant information.

TABLE 1

Illustrative transaction information.
Illustrative merchant information

Assigned merchant representative name
Assigned merchant representative photo
Assigned merchant representative personal goal
Assigned merchant representative hobby
Assigned merchant representative favorite merchant merchandise
Assigned merchant representative wait time
Assigned merchant representative meeting place
Illustrative merchant information
Assigned merchant representative availability for scheduled appointment The user information may be obtained, upon presentation of the digital key to a customer database, from the customer database. The customer database may be separate from the merchant database. The user information may have been previously provided by the user to the customer database.

The apparatus may include, and the methods may involve, a tracking tool for tracking a mobile wireless communication device. The tracking tool may operate in whole or in part on a computing device. The tracking tool may operate in whole or in part distributed over multiple computing devices. The computing device or devices may include a portable electronic wireless communication device.

The tracking tool may include a receiver. The receiver may be configured to receive a WIFI probe request. The tracking tool may include a processor. The processor may be configured to do one or more of: pair a medium access control address with a sequence of locations relative to an access point; record the locations; and detect in an optional probe request field an exceptional value.

The processor may be configured to identify in the exceptional value a digital key. The processor may be configured to identify in the digital key an institutional server address. The processor may be configured to identify in the digital key an institutional server address. The processor may be configured to identify in the digital key a user identifier. The processor may be configured to obtain from the server calling card information. The calling card information may have been previously composed by a user of the device.

The processor may be configured to obtain from a resource database welcome card information. The processor may use the welcome card information and the calling card information to match a staff member with the user. The match may be made based on location, name, customer goals, staff member skills, staff member interests or any other suitable parameters. The calling card information may be matched to a merchant staff member to a staff member near one of the locations. The processor may be configured to transmit to the device the welcome card information.

The tracking tool may include a transmitter. The processor may be configured to cause the transmitter to electronically present the calling card information to a mobile communication device of the staff member. The processor may be configured to receive from the staff member a greeting message. The transmitter may be configured to transmit the welcome card information to the user. The transmitter may be configured to transmit the greeting message to the user.

The receiver may be configured to receive from the staff member a selection of a gift for the user. The processor may be configured to cause a transmitter to transmit the selection to a point of sale apparatus to cause apparatus at, near or in communication with a point-of-sale apparatus to dispense the gift to the user. The gift may be dispensed contemporaneously with the execution of a transaction by the user.

The processor may be configured to record in machine-readable memory a data record including one or more of: a date; a time; one or more of the locations; the institutional server address; the user identifier; the medium access control address; and transaction information from a transaction executed at a point of sale device in electronic communication with the processor.

Table 2 shows illustrative examples of transaction information.

TABLE 2

Illustrative transaction information.
Illustrative transaction information

Transaction instrument identification information
Transaction instrument issuer information (e.g., a bank issuer number ("BIN"))
Financial institution account information
Financial institution routing identification information
Transaction processing network identification information
Transaction amount information
Electronic Fund Transfer information
ACH information
Other suitable information The processor may be configured to transmit one or more of the: date; the time; the one or more locations; the institutional server address; the user identifier; the medium access control address and the transaction information to a server at the institutional server address.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to create UI pages, profiles, data records and the like, digital keys, digital customer calling cards and/or perform any suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
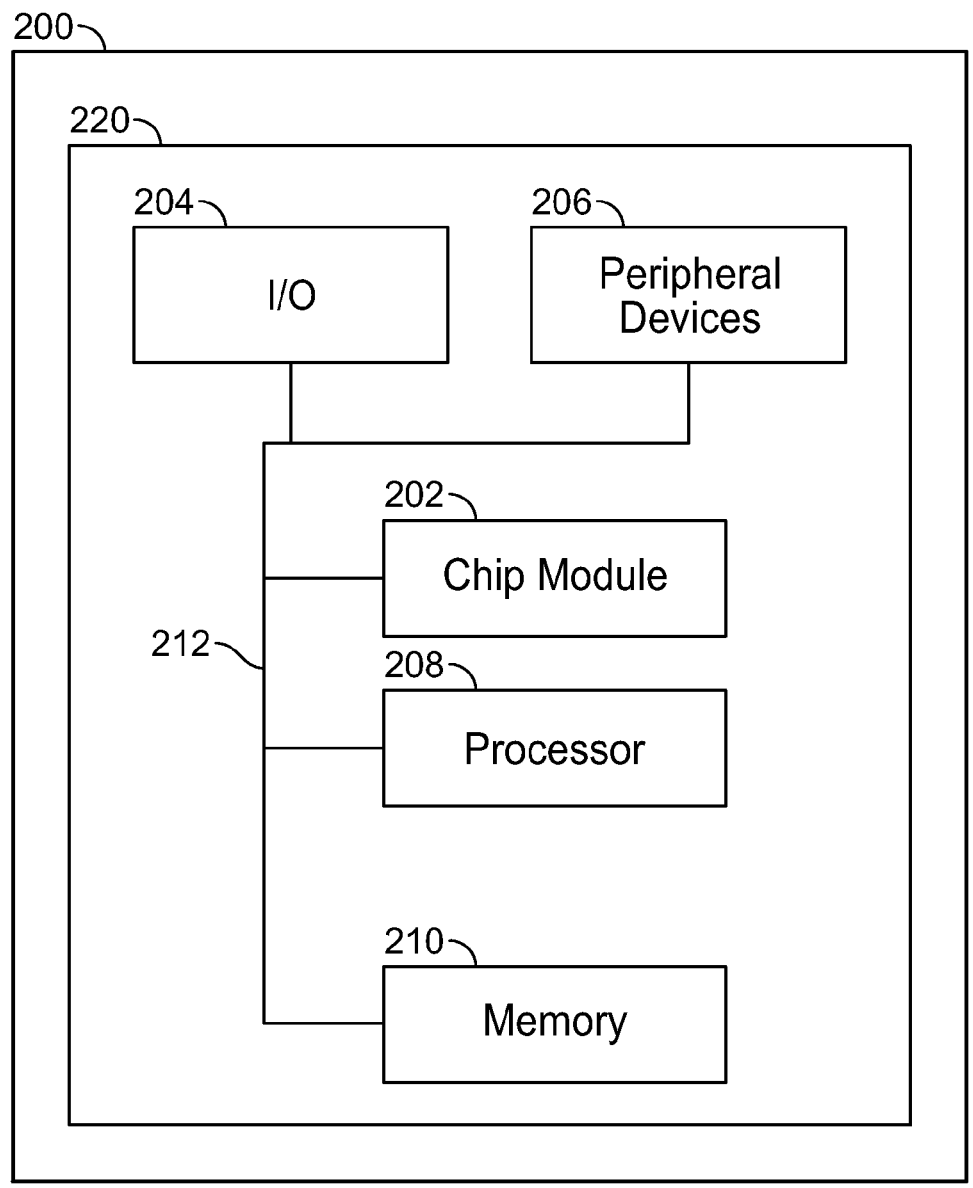
FIG. 2 shows illustrative apparatus in accordance with principles of the invention.

FIG. 2 shows an illustrative apparatus 200 that may be configured in accordance with the principles of the invention. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: values for 802.11 frames, derivatives of 802.11 frames or other WIFI-related standard frames and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
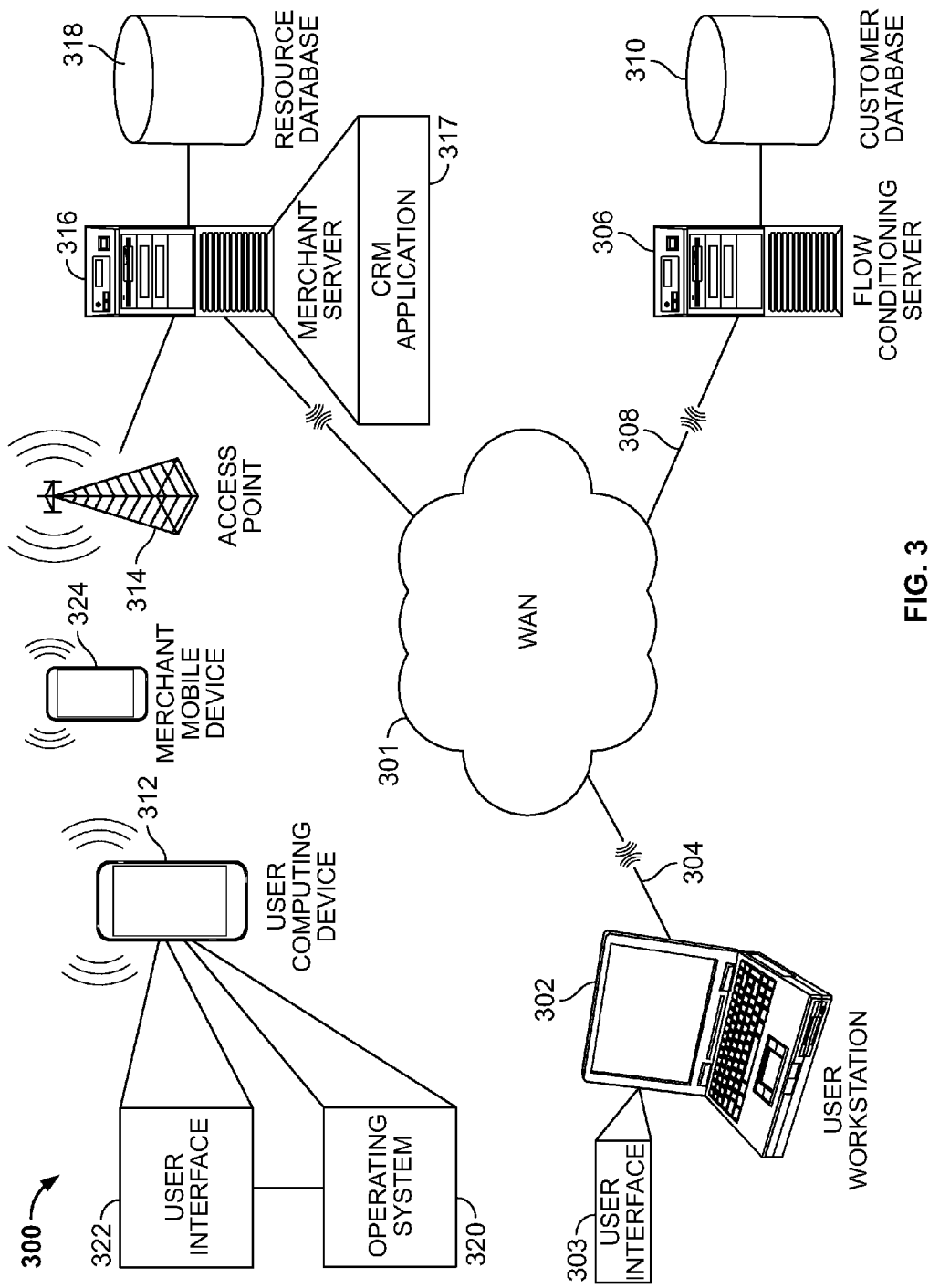
FIG. 3 shows illustrative apparatus in accordance with principles of the invention.

FIG. 3 shows a view of illustrative apparatus 300. Illustrative apparatus 300 may include one or more of the devices shown in FIGS. 1 and 2. Illustrative apparatus 300 may include wide area communication network ("WAN") 301. WAN 301 may be in wired or wireless communication with user workstation 302. Workstation 302 may be in communication with WAN 301 through wired or wireless channel 304. Workstation 302 may support user interface ("UI") 303. A user may use user interface 303 to provide digital customer calling card information to flow conditioning server 306. A user may use user interface 303 to set parameters of dynamic filtering information to flow conditioning server "FCS" 306.

The user may use user computing device 312 to access comparative shopping information during a shopping activity at a facility of the merchant.

User computing device 312 may include hardware for running operating system 320 and user interface ("UI") 322, which may have one or more features in common with a user interface that runs on user workstation 302.

The user may use user interface 322 to control the provision of the digital customer calling card to the merchant. The user may use user interface 322 to provide a media access code for user computing device 312 to the merchant in a manner in which the merchant also receives the digital key.

User computing device 312 may wirelessly communicate with WAN 301 via access point 314. Access point 314 may be in communication with merchant server 316. Merchant server 316 may support customer relations management ("CRM") application 317. Merchant server 316 may be in communication with resource database 318.

Flow conditioning server 306 may be in wired or wireless communication with WAN 301 through wired or wireless channel 308. Server 306 may store information from the user in customer database 310.

Figure 4:
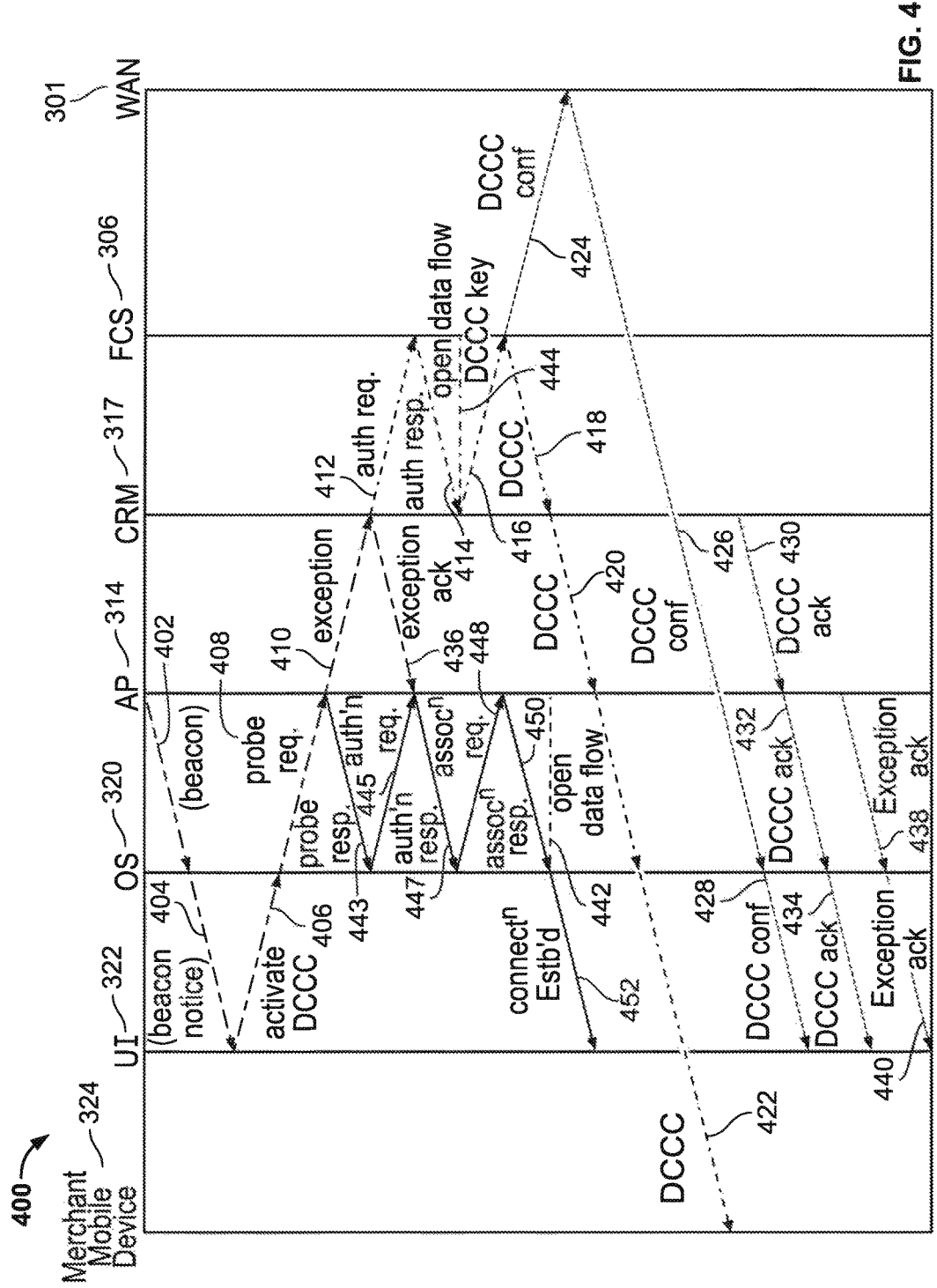
FIG. 4 shows illustrative information in accordance with principles of the invention.

FIG. 4 shows illustrative data flow 400 between UI 322, OS 320, AP 31, CRM 317 and FCS 306.

AP 314 may transmit BEACON 402 to OS 320. UI 322 may monitor an output of OS 320 to detect via BEACON NOTICE whether beacon 402 has been received. UI 322 may instruct OS 320 to decline or ignore beacon 402. UI 322 may ask the user whether to transmit the digital key to the merchant. The user may select in UI 322 "ACTIVATE CALLING CARD." UI 322 may insert the digital key in a memory location on board user computing device 312. UI 322 may then instruct OS 320 to issue PROBE REQUEST 408 TO AP 314. OS 320 may retrieve the digital key as part of a VLAN tag.

The digital key may not comply with the format of the VLAN tag. The digital key may comply with the format of the VLAN tag. The digital key may be issued in a manner not responsive to BEACON 402 so that AP 314 does not expect to receive a compliant VLAN tag. If AP 314 does not expect to receive a VLAN tag and AP 314 does receive a VLAN tag, the presence of data in the VLAN tag field may trigger the transmission to CRM 317 of EXCEPTION 410.

If AP 314 receives a noncompliant VLAN tag, the presence of the noncompliant VLAN tag in the VLAN tag field may trigger the transmission to CRM 317 of EXCEPTION 410.

EXCEPTION 410 may include the digital key.

CRM 317, in response to EXCEPTION 410 may open communication with FCS 306 by transmitting to FCS 306 AUTHENTICATION REQUEST 412. FCS 306 may open communication with CRM 317 by transmitting to CRM 317 AUTHENTICATION RESPONSE 414. CRM 317 may forward the digital key, e.g., DCCC KEY 416, from EXCEPTION 410, to FCS 306.

In return, FCS 306 may transmit to CRM 317 DCCC 418. CRM 317 may transmit DCCC 420 (differently numbered by convention herein because it is in a different transmission) to AP 314. AP 314 may transmit DCCC 422 to merchant mobile device 324.

After receiving DCCC key 416, FCS 306 may route to WAN 304 DCCC CONFIRMATION 424. WAN 304 may route DCCC CONFIRMATION 426 to OS 320. OS 320 may communicate DCCC CONFIRMATION 428 to UI 322 to notify the user that the DCCC was provided to the merchant. The user may thus become informed that the MAC address of user computing device 312 was made available to the merchant and that the merchant retrieved the DCCC.

After receiving DCCC 418, CRM 317 may provide DCCC ACKNOWLEDGMENT 430 to AP 314. AP 314 may provide DCCC ACKNOWLEDGMENT 432 to OS 320. OS may provide DCCC ACKNOWLEDGMENT 434 to UI 322. The merchant may thus provide the user with the merchant's own notification that the merchant received the DCCC. This may provide transparency so that the user knows that the merchant is trying to provide the user with responsive service.

After receiving EXCEPTION 410, CRM 317 may transmit back to AP 314 EXCEPTION ACKNOWLEDGMENT 436. AP 314 may send EXCEPTION ACKNOWLEDGMENT 438 back to OS 320. OS 320 may provide EXCEPTION ACKNOWLEDGMENT 438 to UI 322. This may indicate to the user that the merchant has received the digital key.

Open two-way data flow may be present between OS 320 and AP 314 at or below line 442. Open two-way data flow may be present between CRM 317 and FCS 306 at or below line 444.

After AP 314 receives probe request 408, AP 314 may establish two-way communication with OS 320. AP 314 may send PROBE RESPONSE 443 to OS 320. OS 320 may send AUTHENTICATION REQUEST 445 to AP 314. AP 314 may send AUTHENTICATION RESPONSE 447 to OS 320. OS 320 may send ASSOCIATION REQUEST 448 to AP 314. AP 314 may send ASSOCIATION RESPONSE 450 TO OS 320. OS 320 may send CONNECTION ESTABLISHED message 452 to UI 322.

UI 322 may use one or more of DCCC CONFIRMATION 428, DCCC ACKNOWLEDGMENT 434, EXCEPTION ACKNOWLEDGMENT 440 and CONNECTION ESTABLISHED message 452 to provide status information to the user regarding the merchant's receipt or acceptance of the user's request to activate the calling card.

Processes in accordance with the principles of the invention may include one or more features of the apparatus or processes illustrated in FIGS. 1-4. For the sake of illustration, the steps of the illustrated processes will be described as being performed by a "system." The "system" may include one or more of the features of the apparatus that are shown in FIGS. 1-4 and/or any other suitable device or approach. The "system" may be provided by an entity. The entity may be an individual, an organization or any other suitable entity.

Figure 5:
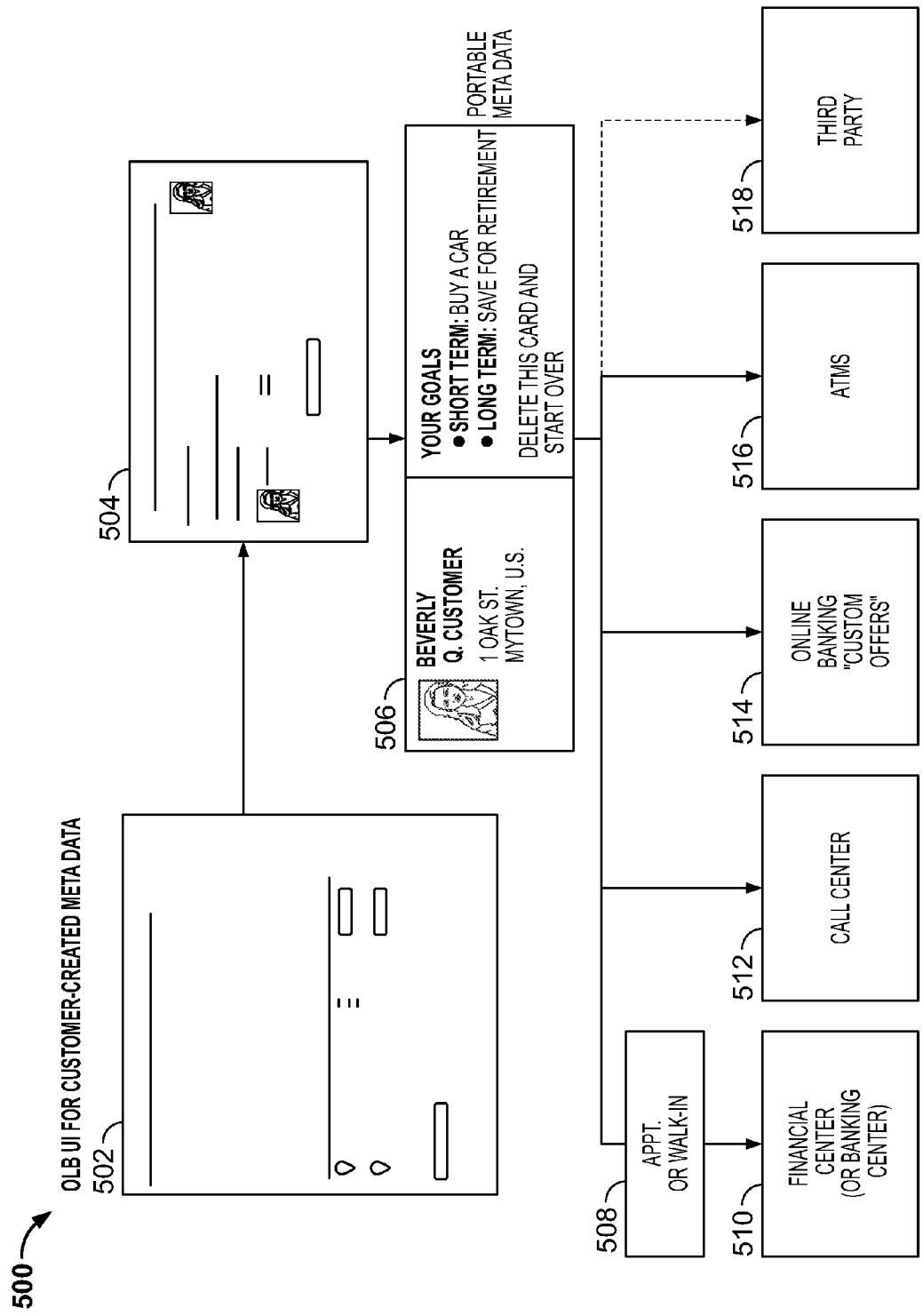
FIG. 5 shows illustrative information in accordance with principles of the invention.

FIG. 5 shows illustrative data flow 500. At step 502 in flow 500, the system may provide to the user introductory information that the user may use to set up the digital customer calling card. At step 504, the system may provide the user with an opportunity to request an appointment with one or more merchants. At step 506, the digital calling card, which may be referred to as portable metadata, may be stored in a customer database, such as customer database 310 (shown in FIG. 3).

The customer database may be delivered or accessible to one or more merchants or one or merchant divisions. For example, the customer database may be accessible to one or more of divisions 510 (banking center), 512 (call center), 514 (online banking, customer offers), 516 (automatic teller machines) of a financial institution. The customer database may be accessible, in a manner such as that shown in FIGS. 3 and 4, by one or more third parties 318.

Figure 6:
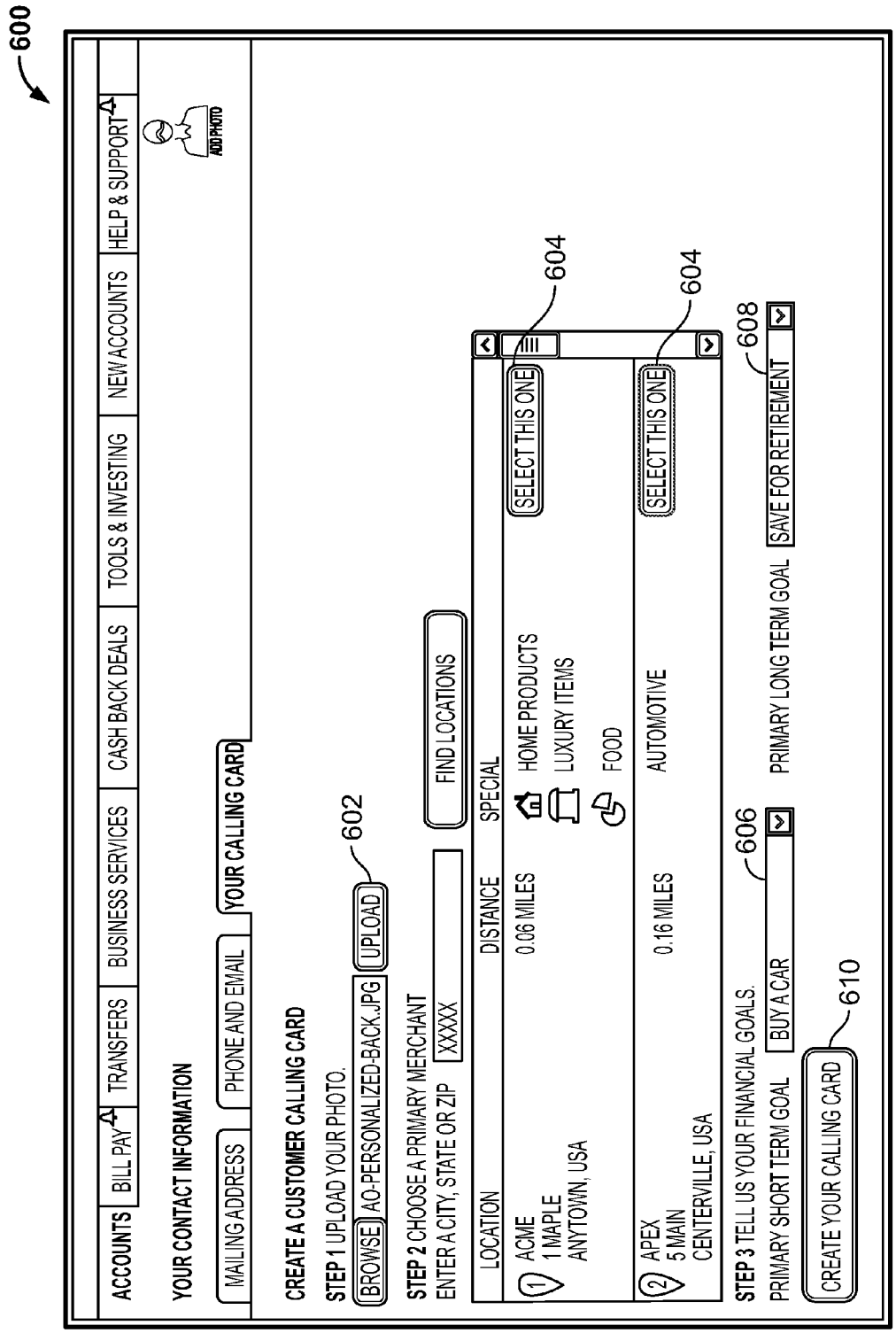
FIG. 6 shows an illustrative data flow in accordance with principles of the invention.

FIG. 6 shows illustrative detail 600 of the introductory information that may be provided at step 502 (shown in FIG. 5). Introductory information 600 may include links 60 for the user to upload his photograph. Introductory information 600 may include user interface control 604 for the user to select one or more merchants. Introductory information 600 may include 606 by which the user may select his primary short term goal. Introductory information 600 may include 606 by which the user may select his primary long term goal. Introductory information 600 may include one or more dynamic filtering controls for the user to select personal information and merchants with whom to share the information. Introductory information 600 may include control 610 by which the user can create the digital customer calling card.

Figure 7:
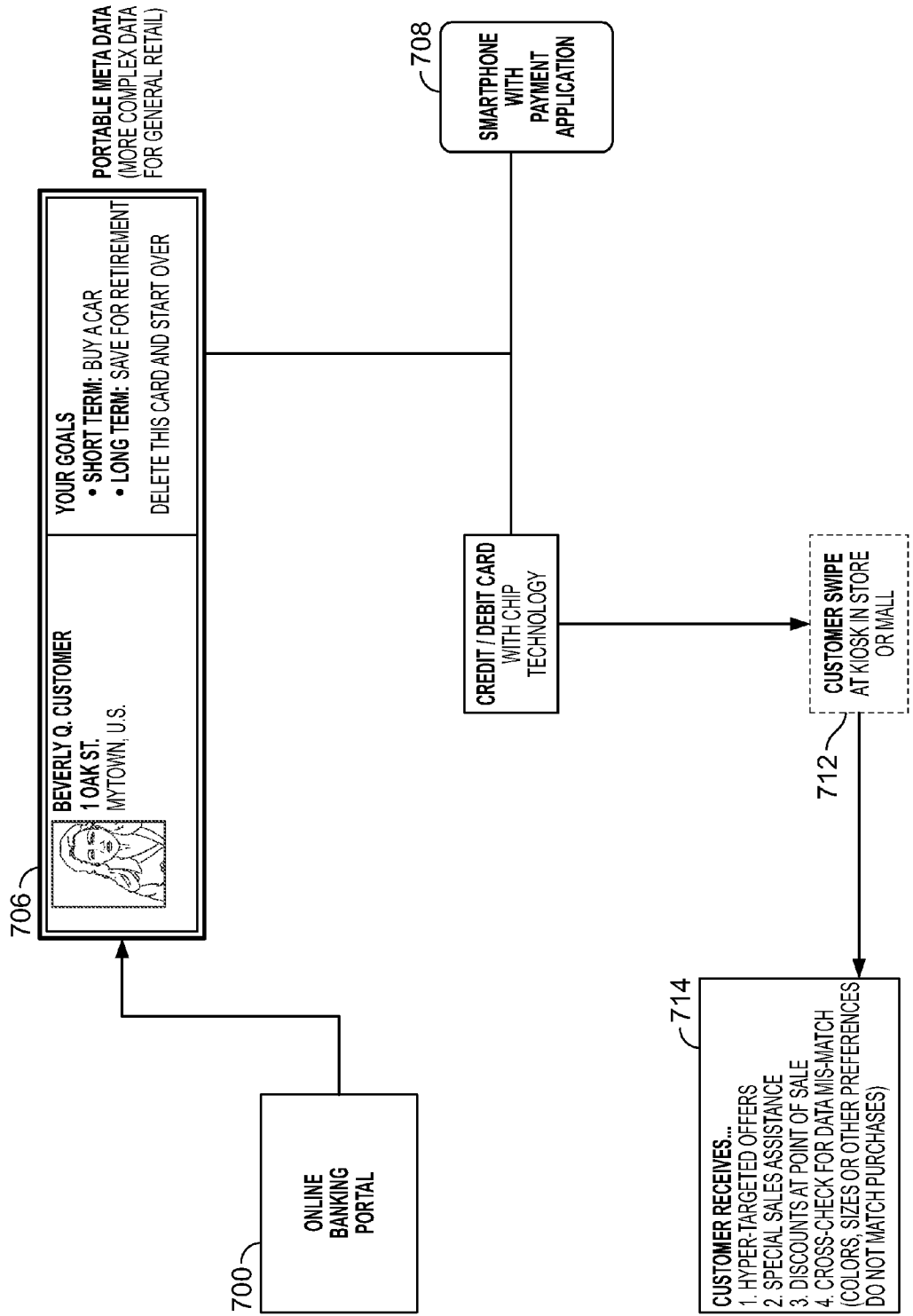
FIG. 7 shows illustrative information in accordance with principles of the invention

FIG. 7 shows illustrative data flow 700. Data flow 700 may provide digital calling card benefits when the transaction instrument is a card. Data flow 700 may provide digital calling card benefits in connection with an online banking platform. The user may use online banking portal 700 to create a card or set up an appointment, analogous with steps 502 and 504 (shown in FIG. 5). At step 706, the user may set up a card and store it in the customer database. If the instrument is a mobile communication device, the calling card may be transmitted as shown in FIGS. 3 and 4. If the instrument is a card, the calling card may be transmitted to the merchant by swiping, as at step 712. At step 714, the user may receive one or more benefits from using the calling card. The benefits may be obtained when the calling card is transmitted by card. The benefits may be obtained when the calling card is transmitted by mobile communication device as shown in FIGS. 3 and 4.

Thus, methods and apparatus for conditioning wireless information flow have been provided. Persons skilled in the art will appreciate that the present invention can be practiced by other than the described embodiments, which are presented for purposes of illustration rather than of limitation. The present invention is limited only by the claims that follow.

What is claimed is:

1. A system for conditioning wireless information flow in a wireless network, the system comprising:
   a processor that is configured to:
      store a digital key in a mobile device machine readable memory location designated for an optional WIFI frame field; and
      queue for wireless transmission a probe request that includes a medium access control address corresponding uniquely to the processor; and
   a user interface configured to communicate to the processor an instruction to transmit the digital key to an access point;
   a receiver that is configured to receive from the access point a digital merchant welcome card corresponding to the optional field, and to transfer the digital merchant welcome card to a merchant-processor;
   wherein:
   the digital merchant welcome card includes:
      merchant information from a merchant database, the merchant database comprises both data corresponding to customer history and data corresponding to predicted future customer behavior derived from analysis of the customer history; and
      user information obtained, upon presentation of the digital key to a customer database, from the customer database, the customer database being separate from the merchant database, the user information being previously provided by the user to the customer database;
   the merchant-processor configured to:
      assemble a first list comprising a listing of products and services that an analysis of customer history predicts the customer would choose to purchase and denoting them as such as we as a listing of products and services that an analysis of customer history predicts the customer would not choose to purchase and denoting them as such;
      assemble a second list comprising a listing of products and services associated with the user information, each of the products and services is denoted as an item that is either one that a customer would choose to purchase or would not choose to purchase;
      detect a contradiction between the denotations of the products and services of the first list and the denotations of the same products and services of the second list, each contradiction defining an interest;
      identify a staff member associated with the interest; and
      transmit to the mobile device, via the access point, contact information for the staff member; and
   the key includes a server address for the customer database and a user identifier that is mapped to a user flow conditioning database record in the customer database, corresponding to an individual having access to the processor.

2. The system of claim 1 wherein the probe request is an IEEE 802.1Q compliant probe request.

3. The system of claim 1 wherein the field is an IEEE 802.1Q virtual local access network ("VLAN") tag.

4. The system of claim 1 further comprising a receiver and a transmitter; wherein:
   the receiver is configured to receive a WIFI access point beacon; and
   the processor is configured to cause the transmitter to transmit the key over a WIFI channel only after the receiver receives the beacon.

5. The system of claim 4 further comprising a user interface; wherein the processor is further configured to cause the transmitter to transmit the key only in response to a user-interface instruction to transmit the key.

6. The system of claim 1; wherein the processor is configured to receive from the user interface:

a user-input instruction to not automatically respond to a WIFI access point beacon; and a user-input instruction to broadcast the key.

7. The system of claim 6 further comprising a transmitter; wherein the processor is configured to:

obtain from an on-board geographic positioning system application map coordinates corresponding to a location of the processor at a time the probe request was transmitted; and cause the transmitter to transmit to a customer database:

the digital key;

a transmission log entry corresponding to transmission of the probe request; and the map coordinates.

8. The system of claim 7 wherein the processor is further configured to:

determine a merchant identity corresponding to the map coordinates;

display the merchant identity to a user; and receive from the user a confirmation that the user is present in a location corresponding to the merchant identity.

* * * * *